United States Patent [19]
Serafin et al.

[11] 3,865,601
[45] Feb. 11, 1975

[54] ADDITIVE FOR IMPROVING HYDRAULIC CEMENT COMPOSITIONS

[75] Inventors: Frank G. Serafin, Peabody; Robert W. Previte, Lawrence; Robert F. Stierli, Lexington, all of Mass.

[73] Assignee: W. R. Grace & Co., Cambridge, Mass.

[22] Filed: Oct. 5, 1973

[21] Appl. No.: 403,963

[52] U.S. Cl................ 106/95, 106/90, 106/92, 106/93, 106/102
[51] Int. Cl.................................. C04b 7/56
[58] Field of Search............ 106/90, 92, 93, 95, 102

[56] References Cited
UNITED STATES PATENTS

| | | | |
|---|---|---|---|
| 1,772,999 | 8/1930 | Huber | 106/90 |
| 2,420,144 | 5/1947 | Mark | 106/95 |
| 3,008,843 | 11/1961 | Jolly | 106/90 |
| 3,097,955 | 7/1963 | Harris | 106/95 |
| 3,547,665 | 12/1970 | Johnson | 106/95 |

*Primary Examiner*—J. Poer
*Attorney, Agent, or Firm*—William L. Baker; C. Edward Parker

[57] ABSTRACT

An additive for imparting water repellancy to, and retarding the set of hydraulic cement compositions (e.g. Portland cement compositions such as masonry cements) is described which is an aqueous oil-in-water emulsion containing water, a water-insoluble, water-repelling acid component (e.g. tall oil), an emulsifier (e.g. a salt of such acid), and a setting time-retarding agent (e.g. sucrose). The additive is ideally dispersible in water and preferably contains an air-entraining agent as an additional optional component. Intergrinding the emulsified additive with the cement component is the preferred manner of incorporating the additive in the cement composition.

7 Claims, No Drawings

ADDITIVE FOR IMPROVING HYDRAULIC CEMENT COMPOSITIONS

BACKGROUND OF THE INVENTION

This invention relates to additives for hydraulic cement compositions. More particularly, this invention concerns an additive for hydraulic cement especially Portland cement compositions such as masonry cements used to bond brick, block, etc.

Hydraulic cement compositions such as masonry cements employed for bonding brick, block and the like, are usually based upon mixtures of Portland cement (containing gypsum), limestone and often slag. The mixture usually contains additives for imparting certain desirable properties such as water-insoluble fatty acids and rosin acids to impart water-repellancy to the finished masonry cement. Materials such as carbohydrates are also commonly added to delay the setting time of the cement and thereby increase the "board life" of the cement for the convenience of the mason. It has also often been found desirable to incorporate an air-entraining agent in masonry cements to render the cement more "plastic." It is common practice to mix such additives with the cement during the intergrinding of the cement with gypsum, with limestone, or both, and it is usually required that two or more of the additives be dispensed separately due to their mutual insolubility.

SUMMARY OF THE INVENTION

A novel water-repelling and set-retarding additive composition for incorporation in Portland cement and other hydraulic cement compositions especially masonry cements, has been found which composition can ideally be dispensed to the cement composition or to the cement component in the form of a single, water-dispersible product. The additive composition of the invention is an aqueous oil-in-water emulsion containing water, a water-insoluble, water-repelling acid component, an emulsifier, and a set-retarding agent. The additive composition preferably contains a further optional air-entraining component. Such an additive not only avoids an inconvenient separate addition of the individual components, but also the fact that the additive can be dispersed in water provides a manner of reducing the risk of "overdosing" of the components. Such "overdosing" or accidental addition of excess additive is of particular concern with respect to the set-retarding ingredient since an overdose of this component can render the finished cement useless. The risk of such accidental overdosing is increased in the case of these additives since relatively small amounts, usually less than 0.3 percent, more often less than about 0.15 percent of the cement, are employed. In the case of the present water-dispersible additive, the additive can be first dispersed in a greater proportion of water, an ingredient not harmful to the cement. The risk of overdosing the larger volume of additive is less than that of the nondispersed additive.

DESCRIPTION OF THE PREFERRED EMBODIMENT

The water-repelling component of the emulsion of the invention comprises a water-insoluble fatty acid, rosin acid or mixture thereof, such as is found in tall oil. The water-repelling component is present in a major proportion of the solids portion of the emulsion, that is, greater than 50 percent, preferably from about 60–95 percent by weight of the solids portion.

Any emulsifier which is capable of dispersing the water-repelling component in the aqueous phase of the emulsion and which does not have a deleterious effect on the finished cement composition can be used herein. We prefer to use a salt of a fatty or rosin acid, or mixture of such, particularly an alkali metal salt of such acid, as the emulsifying agent. In a particularly preferred embodiment, the emulsifier is prepared "in situ" by adding a base such as sodium hydroxide to the acid waterproofing component to produce the salt. In this embodiment enough of the base is added to produce sufficient emulsifier to give an emulsion. Other emulsifiers which may be employed include esters of fatty alcohols such as the sulfate, for example ammonium sulfate esters thereof; aromatic sulfonates such as ammonium, alkali and alkaline earth metal aromatic sulfonates; saponified phenols or naphthenic acids, etc. Emulsifiers of the anionic or nonionic type may be used such as for example, liquids or solids selected from the group of alkaryl polyoxyalkylene alkanols and derivatives thereof such as esters thereof for example, ammonium sulfate esters; and polyoxyethylene derivatives of hexitol anhydride partial long chain fatty acid esters. Mixtures of any of the foregoing may be used. In general, the emulsifier is employed in the additive composition of the invention in an amount of at least about 0.5 percent by weight of the solids.

As the set-retarding component of the additive of the invention any of the known retarders for hydraulic cements may be employed. Watersoluble set-retarding agents for Portland cement are well known and are preferred for use in the present invention. Illustrative of such retarders are the carbohydrates such as monosaccharides, for example, glucose and fructose; disaccharides, for example, lactose and sucrose; trisaccharides for example, raffinose; polysaccharides, for example, starch and cellulose as well as derivatives thereof such as pregelatinized starch, dextrin, corn syrup and carboxymethylcellulose; polyhydroxy polycarboxylic compounds, such as tartaric acid and mucic acid; lignosulfonic acid and salts thereof such as calcium, magnesium, ammonium and sodium lignosulfonate; water-soluble salts of boric acid, such as the alkali metal salts thereof; zinc oxide; and water-soluble silicone compounds; as well as mixtures thereof. The amount of the retarding agent employed in the additive of the invention generally ranges from about 3 to about 35, preferably from about 10 to about 20 percent by weight of the solids.

The water-repelling acid component or the emulsifying component may impart a degree of air-entrainment to the finished cement composition, but in some instances it may be desired to enhance the amount of air entrained by including a further additional air-entraining component in the additive of the invention. Various materials such as alkali metal salts of tall oil acids are known which will entrain air in cement compositions any of which may be employed herein so long as it is compatible with the other components of the emulsion. We prefer to use condensation products of ethylene oxide with, e.g. an aromatic organic compound such as substituted or unsubstituted phenol or an aliphatic organic compound such as fatty acid, alcohol, ester, aldehyde, amine, etc. Especially preferred are the watersoluble alkylarylpolyether alcohols. The preferred air-entraining agents help to render the emulsion stable for longer periods of time. When this additional air-entraining component is employed, an amount generally ranging from about 1 to about 5 weight percent of solids is employed.

The amount of water employed in the emulsion is preferably at least about 25 to 30 percent by weight of the total. A preservative may be used in the additive of the invention to prevent spoilage, and about 1 percent of the preservative is ordinarily found to be effective.

In use as an additive to cement compositions, the emulsion of the invention is incorporated in an amount generally ranging between about 0.001 to about 0.3 percent by weight of solids based upon the weight of the cement. The preferred manner of addition is by intergrinding the emulsion with the cement or cement clinker with or without other components of the composition. As aforementioned, the additive of the invention can be ideally initially dispersed in a greater proportion of water, in which form it can be more accurately dispensed.

The following detailed examples are illustrative only and are not to be considered as limiting.

EXAMPLE I

An emulsion is formed containing the following ingredients in the proportions shown:

| Component | Weight % |
| --- | --- |
| Tall Oil | 26.6 |
| Retarder$^{(a)}$ | 13.9 |
| Base$^{(b)}$ | 1.5 |
| Air-entraining agent$^{(c)}$ | 1.1 |
| Water | 56.9 |

$^{(a)}$ sucrose
$^{(b)}$ sodium hydroxide
$^{(c)}$ octylphenoxy polyethoxy ethanol The above composition resulted in a stable, water dispersible emulsion which did not break up after storage at 40°F. or after being frozen.

EXAMPLES II - V

The following additional additive emulsions were prepared according to the invention:

| Component | Weight % | | | |
| --- | --- | --- | --- | --- |
| Examples | II | III | IV | V |
| Tall Oil | 60.2 | 56.8 | 53.5 | 46.7 |
| Retarder$^{(a)}$ | 7.0 | 10.5 | 14.0 | 21.0 |
| Base$^{(b)}$ | 0.3 | 0.3 | 0.3 | 0.3 |
| Air-entraining agent$^{(c)}$ | 2.5 | 2.4 | 2.2 | 2.0 |
| Water | 30.0 | 30.0 | 30.0 | 30.0 |

$^{(a)}$ sucrose
$^{(b)}$ sodium hydroxide
$^{(c)}$ octylphenoxy polyethoxy ethanol

EXAMPLE VI

The emulsions of Examples I and II and a commercial air-entraining agent were interground at an addition rate of 0.1 percent with a masonry cement containing approximately 34 percent of Portland cement, 46 percent of limestone and 20 percent slag to an approximate surface area of 6819 cm2/g in the case of additive I, 6929 cm2/g in the case of additive II and 6743 cm2/g in the case of the commercial air-entraining agent. The resulting compositions were tested for setting time and degree of air-entrainment according to ASTM procedures. The results were as follows.

| | ASTM C91 AIR ENTRAINMENT | | |
| --- | --- | --- | --- |
| Additive | W/C | Flow | % Air |
| Commercial Additive | .50 | 108 | 19.60 |
| Example I | .47 | 113 | 19.95 |
| Example II | .47 | 111 | 20.89 |

| ASTM C266 GILLMORE SETTING TIME | | | |
| --- | --- | --- | --- |
| | | Setting Time | |
| Additive | % Normal Consistency | Initial | Final |
| Commercial Additive | 26.0 | 2:18 | 3:25 |
| Example I | 24.5 | 3:08 | 4:22 |
| Example II | 24.5 | 2.52 | 3:58 |

EXAMPLE VII

Several water-repellancy field tests according to ASTM SS-C-181e, Federal Specification for Masonary Cement were conducted on masonry cements in which the additive of Example II was employed in an amount of about 0.1 percent solids on the cement. In all of the field tests, such cements exhibited an acceptable water-repellancy of 5 grams or less water pickup.

What is claimed is:

1. The method of preparing a water-repellant, set-retarded hydraulic cement composition, said method comprising the steps of preparing an oil-in-water emulsion containing water and a solids portion comprised of a major proportion of a water-insoluble, water-repelling acid component selected from the group consisting of fatty acids, rosin acids and mixtures thereof, from about 3 to about 30 percent by weight of a set-retarding component for said cement and at least about 0.5 percent by weight of an emulsifier formed by reacting said acid component with a base capable of forming a salt thereof, which salt will maintain a stable emulsion, and thereafter adding said emulsion to said cement in an amount ranging between about 0.001 to about 0.3 percent by weight of solids of said emulsion based on said cement.

2. The method of claim 1 wherein said emulsion is dispersed in water prior to said addition to said cement.

3. The method of claim 1 wherein said cement is Portland cement.

4. The method of claim 1 wherein said emulsion contains as an additional component from about 1 to about 5 percent by weight based on said solids of an air-entraining agent for said cement.

5. The method of preparing a water-repellant, set-retarded, air-entrained Portland cement composition comprising the steps of preparing an oil-in-water emulsion containing water and a solids portion comprised of from about 60 to about 95 percent by weight of tall oil acid, from about 3 to about 35 percent by weight of a retarder selected from the group consisting of carbohydrates, polyhydroxy polycarboxylic acids, lignosulfonic acid and salts thereof, salts of boric acid, silicones, zinc oxide, and mixtures of such, at least about 0.5 percent by weight of a salt of said acid as an emulsifier, and from about 1 to about 5 percent by weight of an air-entraining agent for said cement composition, dispersing said emulsion in a greater proportion of water and intergrinding the dispersed additive with said cement in a grinder in an amount ranging between about 0.001 and about 0.3 percent by weight of solids of said emulsion based on said cement.

6. The method of claim 5 wherein the amount of water in said emulsion is at least about 25 percent by weight of the total.

7. The method of claim 5 wherein said air-entraining agent is a condensation product of ethylene oxide.

* * * * *